United States Patent
Iwaki et al.

[11] Patent Number: 6,127,756
[45] Date of Patent: Oct. 3, 2000

[54] SPINDLE MOTOR HAVING AIR DYNAMIC PRESSURE BEARING AND ROTATING DEVICE HAVING THE SPINDLE MOTOR AS DRIVING SOURCE

[75] Inventors: Tadao Iwaki; Kimio Komata, both of Chiba, Japan

[73] Assignee: Seiko Instruments Inc., Japan

[21] Appl. No.: 09/261,902

[22] Filed: Mar. 3, 1999

[30] Foreign Application Priority Data

| Mar. 4, 1998 | [JP] | Japan | 10-06766 |
| Apr. 14, 1998 | [JP] | Japan | 10-117918 |
| Feb. 26, 1999 | [JP] | Japan | 11-051111 |

[51] Int. Cl.$^7$ ............................................. H02G 5/16
[52] U.S. Cl. ........................................ 310/90; 384/110
[58] Field of Search ................ 310/90, 156; 384/109, 384/110, 112

[56] References Cited

U.S. PATENT DOCUMENTS

| 3,934,950 | 1/1976 | Kuhlmann | 310/90.5 |
| 4,805,972 | 2/1989 | Tanaka et al. | 359/200 |
| 5,541,460 | 7/1996 | Dunfield et al. | 310/67 R |
| 5,689,146 | 11/1997 | Cheever | 310/90 |
| 5,762,422 | 6/1998 | Suzuki et al. | 384/245 |
| 5,855,437 | 1/1999 | Lee | 384/110 |
| 5,873,657 | 1/1999 | Lee | 384/110 |

*Primary Examiner*—Nestor Ramirez
*Assistant Examiner*—Joseph Waks
*Attorney, Agent, or Firm*—Adams & Wilks

[57] ABSTRACT

A spindle motor has a rotor, a stator and an air dynamic pressure bearing for supporting the rotor for rotation about a rotational axis relative to the stator. The air dynamic pressure bearing comprises a first dynamic pressure bearing portion and a second dynamic pressure bearing portion. The first dynamic pressure bearing portion comprises a convex side bearing member having a conical convex portion, a concave side bearing member having a conical concave portion receiving the conical convex portion, and dynamic pressure generating grooves formed on one of a surface of the conical convex portion and a surface of the conical concave portion. The second dynamic pressure bearing portion comprises a shaft having a first end fixed to the concave side bearing member and extending along the rotational axis, a bore formed in the convex side bearing member for receiving a second end of the shaft to permit rotation of the convex side bearing member relative to the concave side bearing member about the shaft, and dynamic pressure grooves formed on one of an outer circumferential surface of the shaft and an inner circumferential surface of the bore.

15 Claims, 7 Drawing Sheets

FIG. 14   PRIOR ART

SPINDLE MOTOR HAVING AIR DYNAMIC PRESSURE BEARING AND ROTATING DEVICE HAVING THE SPINDLE MOTOR AS DRIVING SOURCE

BACKGROUND OF THE INVENTION

The present invention relates to a spindle motor in which a rotor is supported at a stator by an air dynamic pressure bearing having a conical dynamic pressure bearing portion and a radial dynamic pressure bearing portion and a rotating device having the spindle motor as a driving source of a rotating body such as a magnetic disc, an optical disc, and a polygon mirror.

Figure 12:
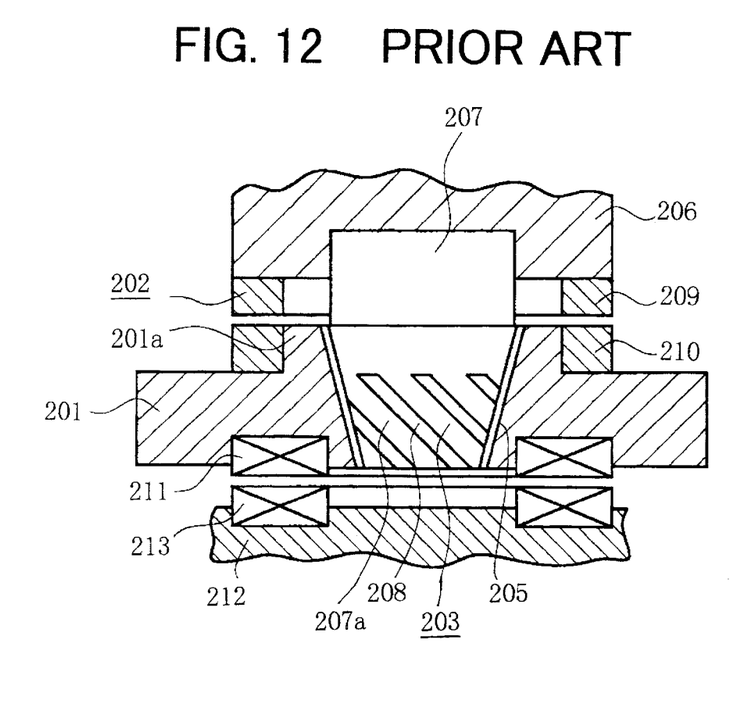
FIG. 12 is a sectional view of the optical deflection device disclosed in Japanese Opened Patent No. 60-208629.

A rotating device using a spindle motor as a driving source of a polygon mirror such as, for example, an optical deflection device is disclosed in Japanese Opened Patent No. 60-208629 as shown in FIG. 12. The bearing of the spindle motor of the rotating device comprises an air dynamic pressure bearing portion 203 and a magnetic bearing portion 202. The air dynamic pressure bearing portion 203 comprises a convex side bearing member 207 having a truncated cone convex portion 207a and a concave side bearing member having a truncated concave portion 205 to which said truncated cone convex portion 207a is fitted without contact, and dynamic pressure generating grooves 208 such as herringbone are formed at the surface of said truncated cone convex portion 207a of the convex side bearing member 207. The concave side bearing member having the truncated concave portion 205 is a member in which a polygon mirror 201 is formed in one body and constitutes a main portion of a rotor. The convex side bearing member 207 having the truncated cone convex portion 207a is formed vertically at a base body 206 of a stator by a columnar attaching portion 201a. The magnetic bearing 202 is a suction type thrust magnetic bearing comprising permanent magnets 209 and 210 fixed respectively facing rotor side and stator side and supports the rotor including the polygon mirror 201 making float. A rotor magnet 211 is attached at the rotor including the polygon mirror 201, and a stator coil 213 is attached at a lower base body 212 facing the rotor magnet 211.

The above-mentioned optical deflecting device receives component of radial direction of air dynamic pressure generating at the air dynamic pressure bearing portion 203 to radial direction by forming the bearing comprising the air dynamic pressure bearing portion 203 and the magnetic bearing portion 202, and can rotate at high speed without contact smoothly and stably receiving magnetic suction force toward thrust direction by thrust direction component of air dynamic pressure generating at the air dynamic pressure bearing portion 203 to thrust direction. However, there has been a problem that supporting the shaft toward the radial direction is hard to be stable as the above-mentioned deflecting device is hard to miniaturize because it has the magnetic bearing 202 and radial dynamic pressure has only radial direction component of air dynamic pressure generating at the air dynamic pressure bearing portion 203.

In Japanese Opened Patent No. 2-173610, an optical deflection device has a spindle motor in which a rotor is supported at a stator by an air dynamic pressure bearing comprising at least the following tour components: a columnar bearing member in which radial dynamic pressure generating grooves are formed at an outer circumference face thereof; a cylindrical bearing member being a cylindrical member constituting a radial dynamic pressure portion in which the columnar bearing member is inserted rotatablly and constituting a part of a rotor; a first disk-shaped thrust member being a disk-shaped member in which a dynamic pressure generating grooves are formed at lower face thereof and constituting a first thrust dynamic pressure portion with upper end face of said cylindrical bearing member fixed at upper end portion of said columnar bearing member; and a second disk-shaped thrust member being a disk-shaped where dynamic pressure generating grooves are formed at upper face thereof and constituting a second thrust dynamic pressure portion with lower end face of said cylindrical bearing member fixed at upper end portion of said columnar bearing member.

As the optical deflection device disclosed in the Japanese Opened Patent No. 2-173610 is a rotating device having an air dynamic pressure bearing comprising one radial dynamic pressure bearing portion and two, upper and lower thrust dynamic pressure bearing portions, there is not any problem such as that it is difficult to miniaturize and it is unstable to support the shaft of radial direction in the rotating device disclosed in the Japanese Opened Patent No. 60-208629. However, because the air dynamic pressure bearing adopted in the prior rotating device needs at least four components: the columnar bearing member; the cylindrical bearing member; and two, upper and lower disk-shaped thrust members, parallelism of the two disk-shaped thrust members must be finished in high accuracy, working cost is high, and therefore, price of products is high. Moreover, as the disk thrust members are attached at upper and lower positions just before the motor stops or when the motor starts, sliding with contact which the rotor and the disk-shaped thrust member rub each other at wide area thereof appears so as to be a problem of shortening product life. Furthermore, there is a problem that smooth starting of the motor is obstructed because the rotor aid the disk-shaped thrust member are adhered to each other when the motor starts.

Figure 13:
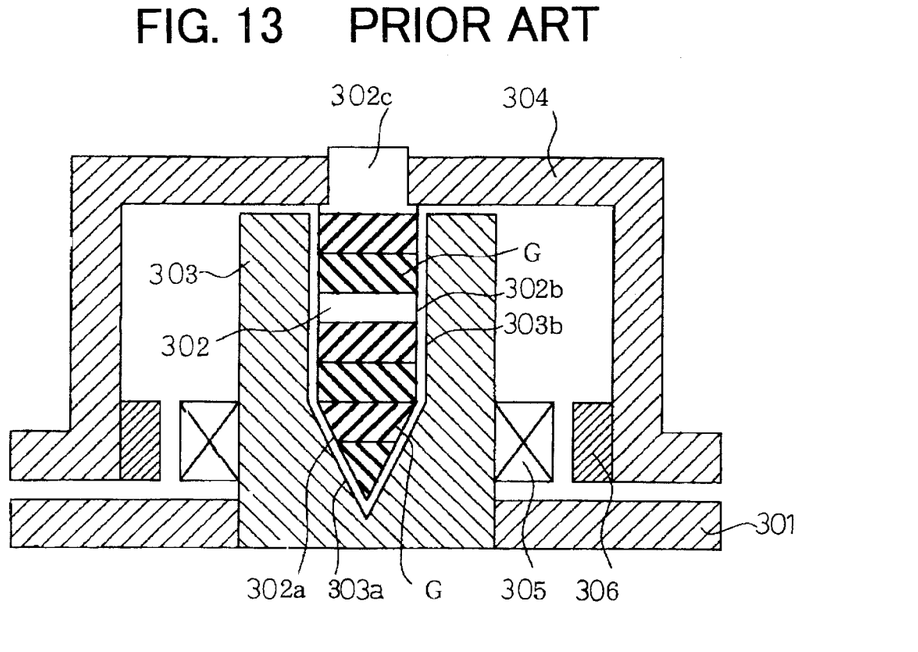
FIG. 13 is a sectional view showing an example of the prior air dynamic pressure bearing having a conical dynamic pressure bearing portion and a radial dynamic pressure bearing portion.

FIG. 13 shows an example of the prior spindle motor in which a rotor is supported at stator by an air dynamic pressure bearing having a conical dynamic pressure bearing portion and a radial dynamic pressure bearing portion. The air dynamic pressure bearing comprises a columnar bearing member 302 in which a conical convex portion 302a is formed at a lower end thereof and a columnar portion 302b is formed at an intermediate portion thereof, and a cylindrical bearing member 303 in which a conical concave portion 303a is formed at a bottom portion thereof and a cylindrical portion 303b at an intermediate portion thereof. The conical dynamic pressure bearing portion comprises the conical convex portion 302a and the conical concave portion 303a, and dynamic pressure grooves G thereof are formed at surface of the conical portion 302a at two, upper and lower stages. Moreover, said radial dynamic pressure bearing comprises the columnar portion 302b and the cylindrical portion 303b. Dynamic pressure grooves G thereof are formed at upper end of the columnar portion 302b in two, upper and lower stages, and at lower end thereof in two, upper and lower stages. The rotor includes a rotor member having a substantially cup-shaped hub construction and attached to rotor magnet 306, and is attached at said air dynamic pressure bearing fitting an attaching hole to the columnar end portion 302c of the columnar bearing member 302. The stator includes a base plate 301 and a stator coil 305. The cylindrical bearing member 303 is formed at the base plate 301 and the stator coil 305 is attached at outer circumference face of the cylindrical bearing member 303.

Figure 14:
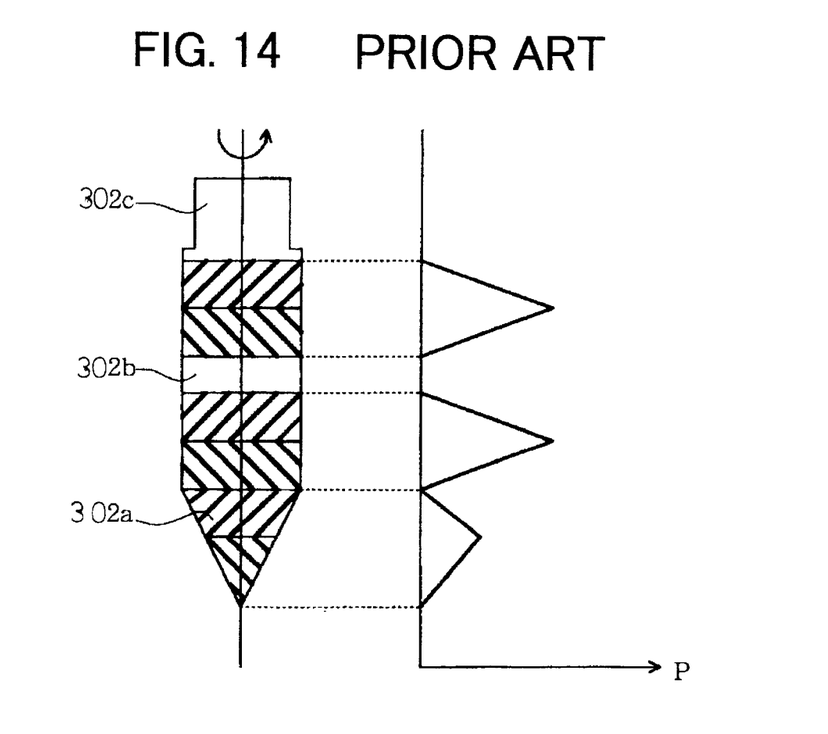
FIG. 14 shows a pressure distribution of the air dynamic pressure bearing of FIG. 13.

As the conical dynamic pressure bearing portion and the radial dynamic pressure bearing portion are located at upper and lower portions on the rotating shaft, namely thrust direction in the air dynamic pressure bearing, the whole bearing becomes long. Pressure distribution of the bearing at the air dynamic pressure bearing has three peaks on the rotating shaft or thrust direction as shown in FIG. 14 defining vertical axis as position and horizontal axis as pressure P. It needs for stability of rotation that gravity position of rotating body having the air dynamic bearing and center of pressure distribution of the bearing are kept so as to match. Because of the restriction of construction, the prior air dynamic pressure bearing shown in FIG. 13 is hard to miniaturize. There is a problem that inclination vibration is likely is easy to generate.

The problem to be solved by the present invention is to provide a spindle motor and a rotating device having the spindle motor as a driving source of a rotating body in which a rotor is supported at a stator by an air dynamic pressure bearing such that the number of components are few, miniaturization is possible, working is easy, sliding with contact just before stop or at start of motor is extremely decreased, and smooth start of motor is not obstructed.

Further, the problem to be solved by the present invention is to further improve stability of rotation by applying said air dynamic pressure bearing to load of larger thrust direction, by removing possibility of generation of inclination vibration, and by preventing undesirable moving to upper side of convex side bearing member in a spindle motor and a rotating device having the motor as a driving source of the rotating body having an air dynamic pressure bearing in which a radial dynamic pressure bearing portion and a conical dynamic pressure bearing portion are located at inside and out side in the same axis respectively.

SUMMARY OF THE INVENTION

To solve the above-mentioned problems, a rotor is supported at a stator by an air dynamic pressure bearing having a first dynamic pressure bearing portion and a second dynamic pressure bearing portion in a spindle motor and a rotating device having the motor as a driving source of a rotating body. The first dynamic pressure bearing portion comprises a convex side bearing member having a conical convex portion and a concave side bearing member having a conical concave portion to which said conical convex portion is fitted without contact, and dynamic pressure generating grooves are formed at any of a surface of said conical convex portion and surface of said conical concave portion. The second dynamic pressure bearing portion comprises: a thin shaft one end of which is fixed co-axially at one side of said convex side bearing member and said concave side bearing member; and a cylinder bored at other side of the convex side bearing member and said concave side bearing member in which said thin shaft is inserted rotatablly, and dynamic pressure generating grooves are formed at any of outer circumference face of said thin shaft and inner circumference face of said cylinder. Said cylinder has a closed end or an opened end. A projection is formed in ring shape to meet needs at any of tip portion of said conical convex portion and bottom portion of said conical concave portion.

Moreover, in the spindle motor comprising a rotor including a rotor magnet, a stator including a stator coil, and an air dynamic pressure bearing supporting the rotor at the stator, said air dynamic pressure bearing of the present invention comprises a conical dynamic pressure bearing portion, a radial dynamic bearing portion, and a thrust dynamic pressure bearing portion.

The conical dynamic pressure bearing portion comprises a top-shaped convex side bearing member having a conical convex portion and a columnar portion in which a cylinder is formed along a center shaft thereof, and a concave side bearing member having a conical concave portion in which said conical convex portion is fitted without contact, and dynamic pressure grooves thereof are at any of a surface of said conical convex portion and a surface of said conical concave portion. Said radial dynamic pressure bearing portion comprises a thin shaft located penetrating through said cylinder and a lower end of which is fixed at a stator, and dynamic pressure generating grooves thereof are formed at any of an outer circumference face of said thin shaft and inner circumference face of said cylinder. The thrust dynamic pressure bearing portion comprises a disk-shaped bearing member fixed at an upper end of said thin shaft and said top-shaped convex side bearing member, and dynamic pressure generating grooves are formed at any of a lower face of said disk-shaped bearing member and a vertical end face of the columnar portion of said top-shaped convex side bearing.

Each dynamic pressure groove of said conical dynamic pressure bearing portion and said radial dynamic pressure bearing portion is formed so that a center of dynamic pressure distribution of rotating shaft direction substantially matches each other so as to remove inclination vibration and to increase stability of rotation. A rotor member in which said rotor magnet is attached has a substantially cup-shaped construction and comprises a part of a magnetic circuit of a motor fitting an attaching hole formed at a center portion of the rotor member to said columnar portion and fixing to said top shaped convex side bearing member. The top-shape convex side bearing member, concave bearing member, and disk-shaped bearing member are made of stainless steel or aluminum, and diamond like carbon (DLC) is formed on a sliding surface thereof with predetermined thickness. A projection portion is formed in order to support a load in the thrust direction at tip portion of said conical convex portion or bottom portion of said conical concave portion.

An air dynamic pressure bearing having a conical dynamic pressure bearing portion suitable for a spindle motor setting 30 to 40 degrees for conical apex angle and putting the point to load capacity of radial direction is realized. Also an air dynamic pressure bearing having a conical dynamic pressure bearing portion suitable for a spindle motor setting 50 to 70 degrees for conical apex angle and putting the point to load capacity of thrust direction is realized. Independently of any conical apex angle, a groove angle of dynamic groove of said conical dynamic pressure bearing is 15 to 20 degrees to generate air dynamic pressure effectively.

DETAILED DESCRIPTION OF THE PREFERRED EMBODIMENTS (A First Embodiment)

Figure 1:
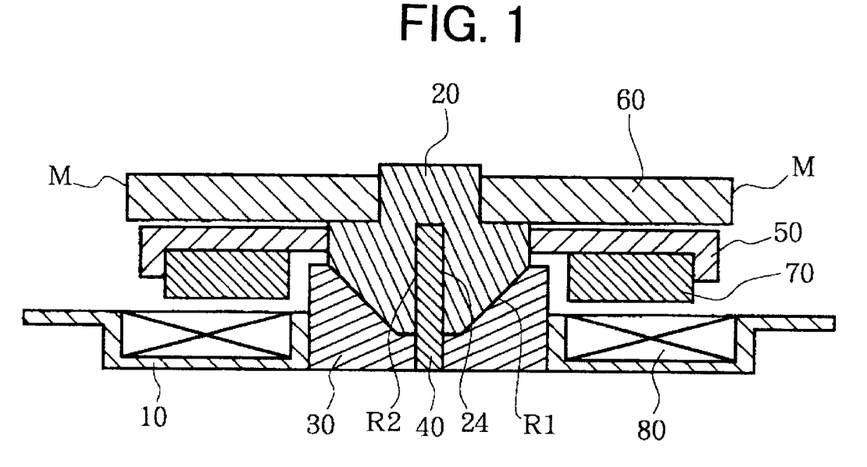
FIG. 1 is a sectional view showing a polygon mirror device having a spindle motor including an air dynamic pressure bearing of a first embodiment of the present invention as a driving source.

FIG. 1 is a sectional view showing a polygon mirror of a first embodiment according to the present invention comprising a spindle motor in which a rotor is supported at a stator by an air dynamic pressure bearing and a polygon mirror 60 driven by the spindle motor. In FIG. 1, the stator of the spindle motor comprises a base frame or fixing basement 10 and a stator coil 80 attached at the fixing basement. The rotor of the spindle motor comprises a cup-shaped hub 50 and a rotor magnet 70 attached at the cup-shaped hub 50 and generating rotation force by electromagnetic action between the exited stator coil 80. The air dynamic pressure bearing of the spindle motor comprises three components: a convex side bearing member 20 in which the cup-shaped hub 50 forming the rotor is fixed co-axially; a concave side bearing member 30 formed at the fixing basement 10 forming the stator, in which the convex side bearing member 20 is fitted without contact; and a thin shaft 40. A polygon mirror is a thick plate-shaped supporting member made of copper or aluminum, and a regular polygon plate-shaped member such as regular hexagon and regular octagon at polygon end faces of which mirror faces are formed.

Figure 2:
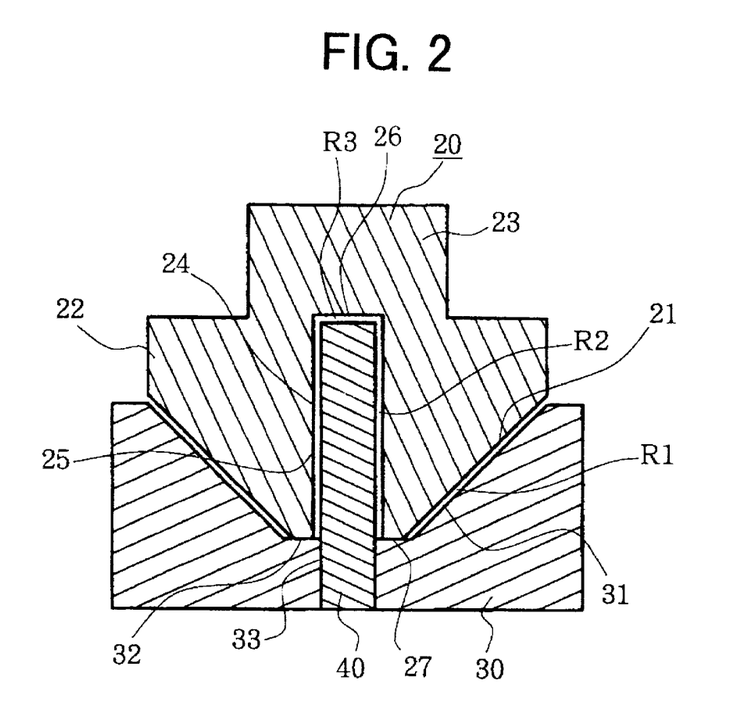
FIG. 2 is an enlarged sectional view overstatedly showing a gap of air dynamic pressure bearing of the polygon mirror device of FIG. 1.
Figure 3:
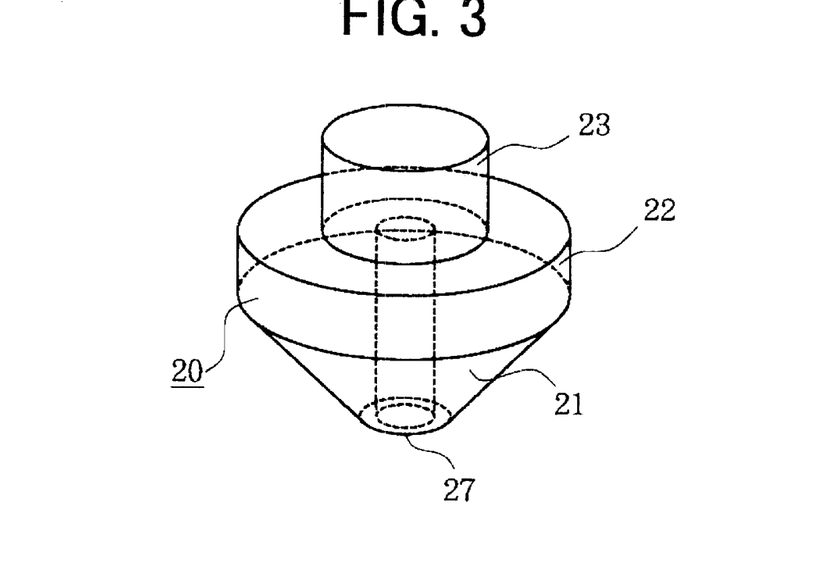
FIG. 3 is a perspective view showing a convex side bearing member 20 of the air dynamic pressure bearing of FIG. 2.
Figure 4:
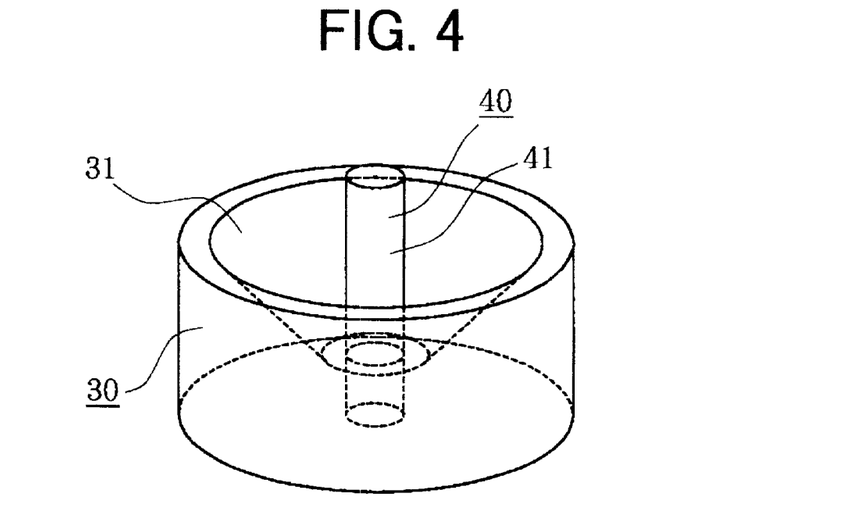
FIG. 4 is a perspective view showing a concave side bearing member 30 fixing a thin shaft 40 of the air dynamic pressure bearing of FIG. 2.
Figure 9:
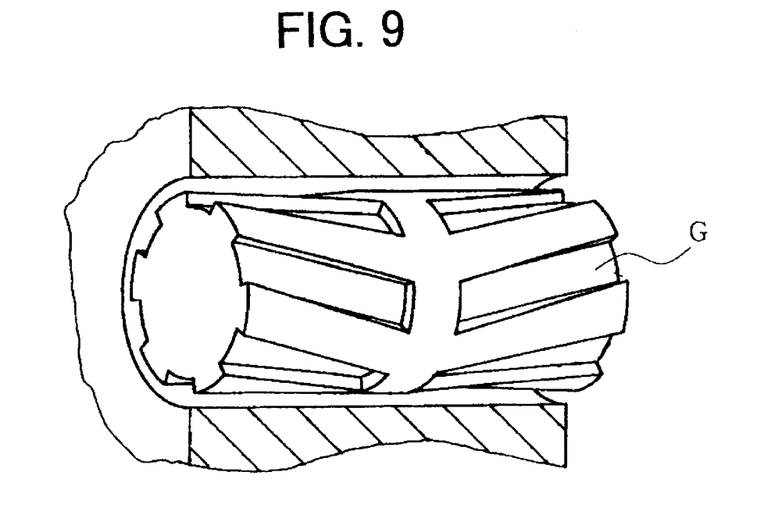
FIG. 9 a perspective view showing an example of a radial dynamic pressure bearing in which herringbone grooves G are formed.

FIG. 2 is an enlarged sectional view overstatedly showing a gap of an air dynamic pressure bearing, FIG. 3 is a perspective view showing the convex side bearing member 20, and FIG. 4 is a perspective view showing a connecting member between the thin shaft 40 and the concave side bearing member 30. The invention will be described further in detail referring these figures. The convex side bearing member 20 is a member having a conical convex portion 21 and a column portion 22. A column end portion 23 fitting to an attaching hole of the polygon mirror 60 is formed at the column portion 22. Dynamic pressure generating grooves such as herringbone grooves G shown in FIG. 9 are formed on a surface of the conical convex portion 21 by working and so on. A cylinder bore 24 in which the thin shaft 40 is inserted rotatably is formed in the convex side bearing member 20. The cylinder bore 24 is a slender cylindrical hole penetrating from a tip end 27 of the conical convex portion 21 to the center portion along center axis, namely a cylindrical hole having a closed end 26, and an inner circumference face thereof is a flat face. The cylinder bore 24 is referred to hereinafter as simply the cylinder 24. The concave side bearing member 30 is a member having a conical concave portion 31 to which the conical convex portion 21 of the convex side bearing member 20 is fitted without contact. The surface of the conical concave portion 31 is a flat surface. Symbol 32 is a bottom portion of the conical concave portion 31. Symbol 33 is a bore or shaft attaching hole formed at the concave side bearing member 30, and bored along center shaft from the bottom portion 32. The thin shaft 40 is a thin column member having dynamic pressure generating grooves such as the herringbone grooved shown in FIG. 9 at an outer circumference thereof. A lower end of the thin shaft 40 is fixed to the concave side bearing member 30 being inserted in the bore or shaft attaching hole 33, and the shaft 40 and the concave side bearing member 30 are integrated as one body to from a connecting member.

After assembly of the convex side bearing member 20 shown in FIG. 3 and the thin shaft 40 and the concave side bearing member 30 shown in FIG. 4, a conical gap R1, a cylindrical gap R2, and a disk-shaped gap R3 are formed respectively between these three bearing component members as shown in FIG. 2. The conical gap R1 is a narrow gap of several micron meters formed between a surface of the conical convex portion 21 and a surface of the conical concave portion 31. Because the dynamic pressure generating grooves are formed at a surface of the conical convex portion 21 and a surface of the conical concave portion 31 is a flat surface as above-mentioned, the convex side bearing member 20 and the concave side bearing member 30 constitute a first dynamic pressure bearing portion with the conical convex portion 21 and the conical concave portion 31. Therefore, the conical gap R1 includes the first air dynamic pressure bearing gap.

The cylindrical gap R2 is a narrow gap of several micron meters formed between outer circumference face of the thin shaft 40 and inner circumference face 25 of the cylinder 24 bored at the convex side bearing member 20. Because the dynamic pressure generating grooves are formed at the outer circumference face of the thin shaft 40 and the inner circumference face of the cylinder 24 is flat a surface as above-mentioned, the thin shaft 40 and the convex side bearing member 20 constitute a second dynamic pressure bearing portion with outer circumference face of the shaft 40 and inner circumference face of the cylinder 24. Therefore, the conical gap R2 includes the second air dynamic pressure bearing gap. Symbol R3 is a gap formed between end portion or the thin shaft 40 and the closed end portion 26 of the cylinder 24.

In the polygon mirror device shown in FIG. 1, when a power supply is turned on, the spindle motor starts, and the rotor rotates, therefore the polygon mirror 60 rotates. Then, operational air is pushed into the conical gap R1 or the first dynamic pressure bearing portion by a pump-in effect so as to generate positive pressure, namely the first air dynamic pressure. The first air dynamic pressure is pressure from wide opening end of the conical gap R1 to the closed end of the center, namely pressure acting in an oblique direction for the rotating shaft of the spindle motor. Therefore, the first air dynamic pressure has two dynamic pressure components: a radial direction and a thrust direction. In other words, the first dynamic pressure bearing portion functions as two bearings: a radial dynamic pressure bearing and a thrust dynamic pressure bearing. At the same time, operational air is pushed into the cylindrical gap R2 of the second dynamic pressure bearing portion by a pump-in effect so as to generate positive pressure, namely the second air dynamic pressure. The second air dynamic pressure is a radial dynamic pressure acting only in the radial direction. Thus, in the polygon mirror device having the spindle motor shown in FIG. 1 as a driving source, the dynamic pressure of thrust direction component of the first dynamic pressure bearing portion acts in the thrust direction. At the same time, dynamic pressure of radial direction component of the first dynamic pressure bearing portion and radial dynamic pressure of the second dynamic pressure bearing portion act in the radial direction so as to place the bearing component members in a non-contact state and to generate enough stiffness to load. Therefore, the spindle motor rotates smoothly and stably at high speed.

(A Second Embodiment)

Figure 5:
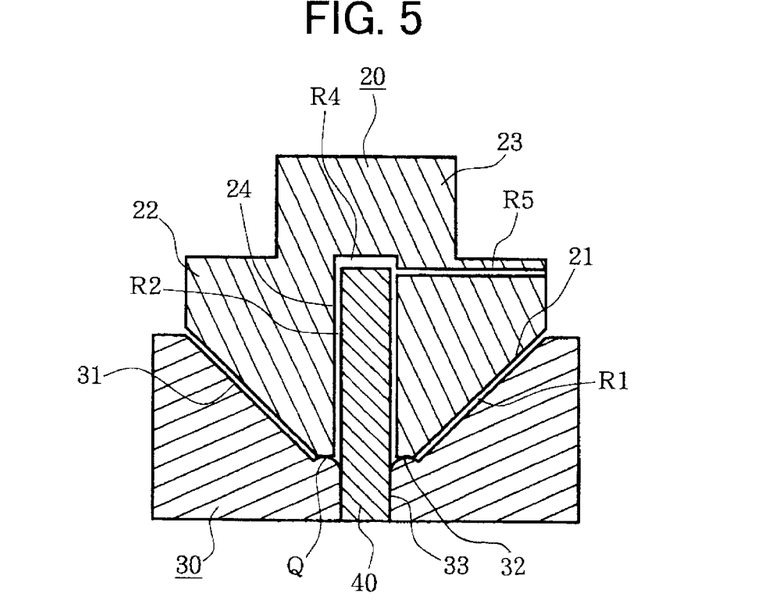
FIG. 5 is an enlarged sectional view overstatedly showing a gap of a second embodiment of air dynamic pressure bearing according to the polygon mirror device of FIG. 1.

FIG. 5 is an enlarged sectional view showing a second embodiment of an air dynamic pressure bearing suitable for the spindle motor according to the present invention. The air dynamic pressure bearing comprises three bearing members: a convex side bearing member 20, a concave side bearing member 30, and a thin shaft 40 as described above for the air dynamic pressure bearing shown in FIG. 2. The convex side bearing member 20 is a member having a conical convex portion 21, at a surface of which dynamic pressure generating grooves such as the herringbone shown in FIG. 9 are formed, and a column portion 22. A column end portion 23 fitting to an attaching hole of a polygon mirror 60 is formed at the column portion 22. A cylinder 24 penetrating from a tip end of the conical convex portion 21 to a center portion is formed along the center shaft in the convex side bearing member 20, and one or plural connecting holes connecting a gap R4 between a closed end of the cylinder 24 and end face of the thin shaft 40 and the air outside are formed. The concave side bearing member 30 is a member having a conical concave portion 31, and a shaft attaching hole 33 is bored at a bottom portion 32 thereof along the center shaft. A mountain-shaped projection Q is formed at the bottom portion 32 of the conical concave portion 31 like ring-shape. The thin shaft 40 is a slender column member at outer circumference face of which dynamic pressure generating grooves such as the herringbone grooves shown in FIG. 9 are formed, lower end of which is inserted into the shaft attaching hole 33 so as to fix to the concave side bearing member 30, and the thin shaft 40 connects with the concave side bearing member 30 in one body as a connecting member.

After assembly of the connecting member of the concave side bearing member 30 and the thin shaft 40 and the convex side bearing member 20, the convex side bearing member 20 and the concave side bearing member 30 constitute a first air dynamic pressure bearing portion with a conical convex portion 21 thereof and a conical concave portion 31, and the thin shaft 40 and the convex side bearing member 20 constitute a second air dynamic pressure bearing portion with outer circumference face of the shaft 40 and inner circumference face of the cylinder 24. Symbol R1 is a conical narrow gap including a first air dynamic pressure gap, and symbol R2 is a cylindrical narrow gap including a second air dynamic pressure bearing gap. Symbol R4 is a gap between a closed end face of the cylinder 24 and tip face of the thin shaft 40.

(A Third Embodiment)

Figure 6:
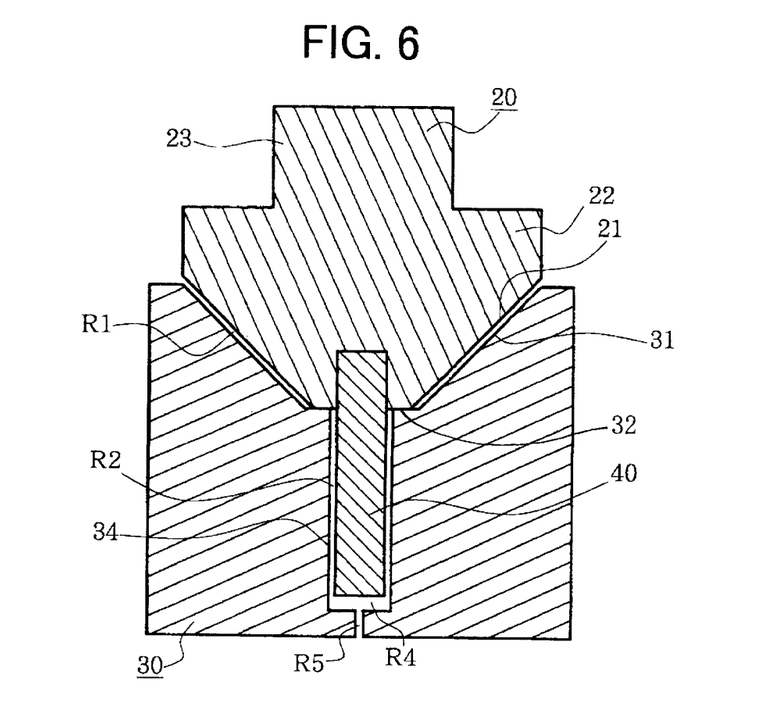
FIG. 6 is an enlarged sectional view overstatedly showing a gap of a third embodiment of air dynamic pressure bearing according to the polygon mirror device of FIG. 1.

FIG. 6 is an enlarged sectional view showing a third embodiment of an air dynamic pressure bearing suitable for the spindle motor according to the present invention. This is an air dynamic pressure bearing in which a thin shaft 40 is fixed at a convex side bearing member 20 being opposed to air dynamic pressure bearings shown in FIG. 2 and FIG. 5 in which the thin shaft 40 is fixed at the concave side bearing member 30. Therefore, in the air dynamic pressure bearing shown in FIG. 6, a cylinder 34 in which the thin shaft 40 is inserted rotatably is formed at the concave side bearing member 30 from a bottom portion 32 of a conical concave portion 31 to center portion along the center shaft. Symbol R1 is a conical narrow gap including a first air dynamic pressure bearing gap, and symbol R2 is a cylindrical narrow gap including a second air dynamic pressure bearing gap. Symbol R4 is a gap formed between a closed end face of the cylinder 34 and tip end face of the thin shaft 40, and Symbol 5 is a small diameter connecting hole connecting the gap R4 to air outside.

As air dynamic pressure bearings shown in FIG. 5 and FIG. 6 have the gap R4 and the connecting hole to air outside R5, positive pressure and bearing stiffness of the second air dynamic pressure bearing portion increase, the bearings can meet further high load, and stability increases. The gap R4 functions as a cushion preventing that a rotor contacts with a stator instantly at stop of the spindle motor. As mountain-shaped projection Q is formed at the bottom portion 32 of the conical concave portion 31 of the concave side bearing member 30 in the air dynamic pressure bearing shown in FIG. 5, a contacting area of a tip end of the conical convex portion 21 of the convex side bearing member 20 at stopping of the spindle motor and the mountain-shaped projection Q, namely contacting area the rotor and the stator of the spindle motor is extremely decreased. Of course, the air dynamic pressure bearing is useful enough as it is depending on use because a tip end face of the conical convex portion 21 is small, therefore contact area with the bottom portion of the conical concave portion 31 is quite small without forming the mountain-shaped projection Q at the bottom portion 32 of the conical concave portion 31 such as FIG. 2 and FIG. 6. The projection Q may be formed at tip end face of the conical convex portion 21 of the convex side bearing member 20.

(A Fourth Embodiment)

Figure 7:
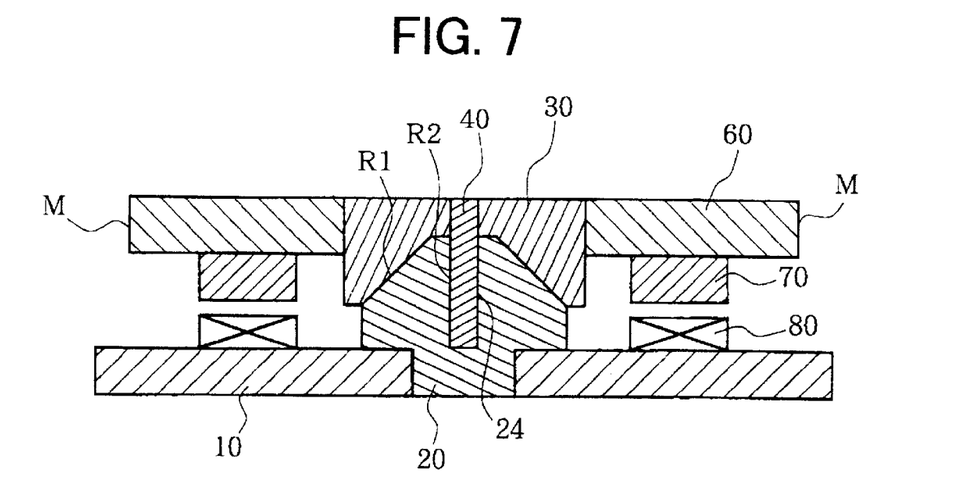
FIG. 7 is a sectional view showing a polygon mirror device having a spindle motor including an air dynamic pressure bearing of a fourth embodiment of the present invention as a driving source.

FIG. 7 is a sectional view of a polygon mirror device driving a polygon mirror 60 with a spindle motor having an air dynamic pressure bearing according to a fourth embodiment of the present invention. The spindle motor comprises a stator including a fixing basement 10 and a stator coil 80 attached at the fixing basement 10, a rotor including a rotor magnet generating rotating force by electromagnetic action between excited stator coil 80 and the rotor, and an air dynamic pressure bearing supporting the rotor at the stator. In the polygon mirror device shown in FIG. 7, the polygon mirror 60 constitutes a part of the rotor of the spindle, and the rotor magnet 70 is attached at the polygon mirror 60 differing from the device shown in FIG. 1. The air dynamic pressure bearing comprises three bearing members: a convex side bearing member 20 having a conical convex portion; a concave side bearing member 30 having a conical concave portion to which said conical convex portion is fitted without contact; and a thin shaft 40 similarly as the air dynamic pressure bearing shown in FIG. 2. However, the convex side bearing member 20 is fixed at the stator and the rotor, namely the polygon mirror 60 is fixed at the concave side bearing member 30 differing from the air dynamic pressure bearing shown in FIG. 2. The thin shaft 40 one end of which is fixed at the concave side bearing member 30 is rotatably inserted into a cylinder 24 formed at the convex side bearing member 20. Applying variation of the device of FIG. 1 as shown in FIG. 5 and FIG. 6 is possible to the air dynamic pressure bearing of the polygon mirror device of FIG. 7 too.

(A Fifth Embodiment)

Figure 8:
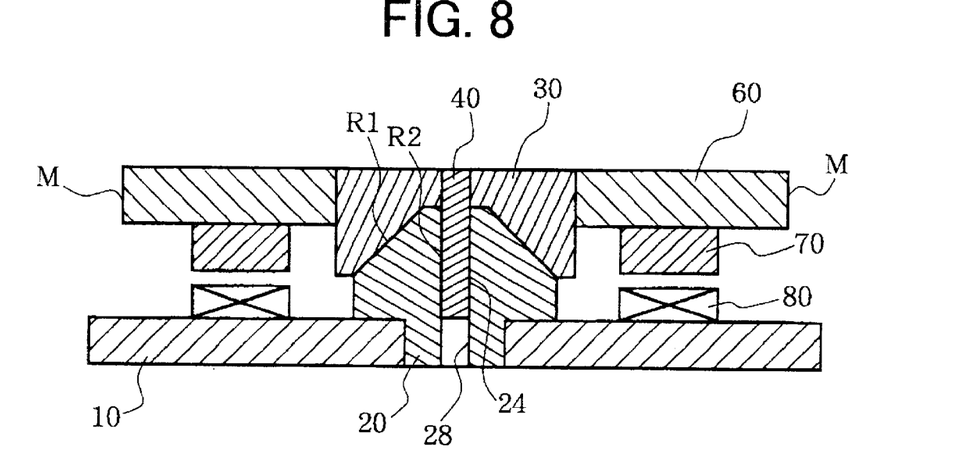
FIG. 8 is a sectional view showing a polygon mirror device having a spindle motor including an air dynamic pressure bearing of a fifth embodiment of the present invention as a driving source.

FIG. 8 is a sectional view showing the device in which a part of construction of the air dynamic pressure bearing of the spindle motor being a driving source of the polygon mirror device shown in FIG. 7. It is characterized in that a second dynamic pressure bearing portion comprises the thin shaft 40 and the cylinder 24 having an opened end 28 remaining a first dynamic pressure bearing portion. As the cylinder 24 of the second dynamic pressure bearing portion does not have a closed end, the device shown in FIG. 8 has the advantage that working and assembling of the air dynamic pressure bearing are easy.

Although dynamic pressure generating grooves are formed at a surface of the conical convex portion 21 and a surface of the conical concave portion 31 is flat face in the first dynamic pressure bearing portion, conversely dynamic pressure generating grooves may be formed at surface of the conical concave portion 31 and surface of the conical convex portion 21 may be flat face. Similarly, although dynamic pressure generating grooves are formed at outer circumference face of the thin shaft 40 and inner circumference face of the cylinder 24 is flat face in the second dynamic pressure bearing portion, conversely dynamic pressure generating grooves may be formed at inner circumference face of the cylinder 24 and outer circumference face of the thin shaft 40 may be flat face. Although the polygon mirror 60 is fixed to the convex side bearing member 20 co-axially being separated with the cup-shaped hub 50 in which the rotor magnet 70 is attached in the polygon mirror device shown in FIG. 1, the polygon mirror 60 may be directly fixed to the cup-shaped hub 50, and these two members nay be made in one body as shown in FIG. 7.

(A Sixth Embodiment)

Figure 10:
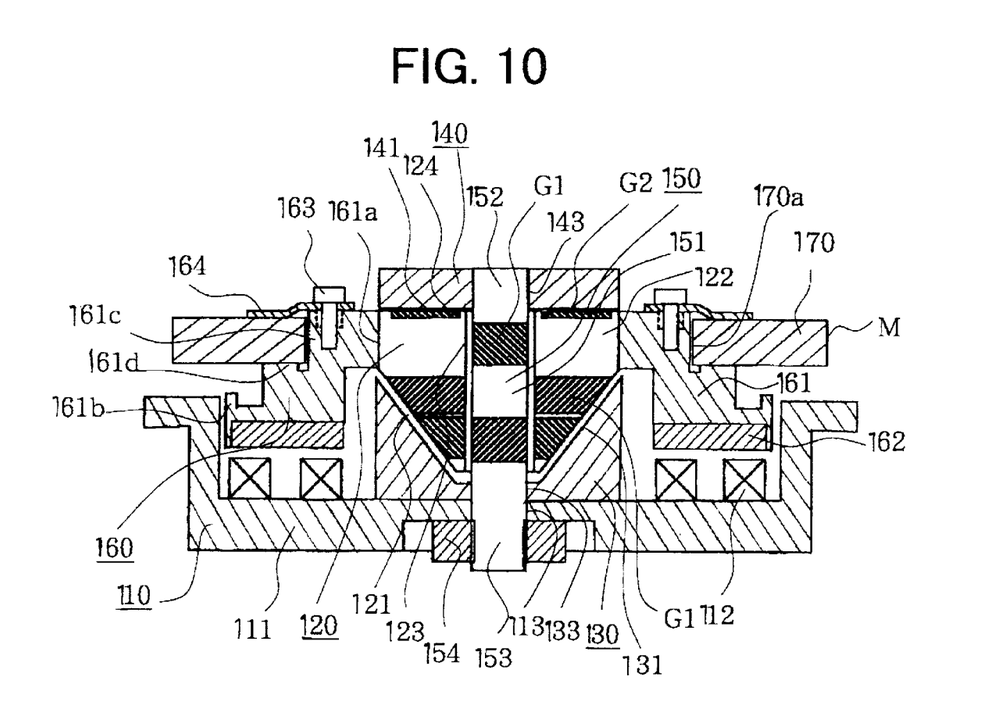
FIG. 10 is a sectional view showing a polygon mirror device driving a polygon mirror with a spindle motor having an air dynamic pressure bearing of a sixth embodiment of the present invention.

FIG. 10 is a sectional view showing a polygon mirror device driving a polygon mirror 170 with a spindle motor having an air dynamic pressure bearing according to a sixth embodiment of the present invention. In FIG. 10, the spindle motor comprises a rotor 160 including a rotor magnet 162, a stator 110 including stator coil 112, and an air dynamic pressure bearing supporting the rotor 160 at the stator 110. The rotor 160 includes a rotor member 161 attached at the air dynamic pressure bearing. The rotor member 161 has a substantially cup-shaped hub construction, and the rotor magnet 162 is attached at an end portion of a vertical portion 161b thereof. The polygon mirror 170, an attaching hole 170a of which is fitted to a ring-shaped attaching portion 161c being horizontal portion of the rotor member 161, is pressed to a receiving portion 161d of the rotor member 161 by a presser spring 164 so as to be firmly attach to the rotor 160. Symbol 163 is a screw fixing a fixing portion of the presser spring 64 to the rotor member 161. The stator 110 includes a stator member 111, and the stator coil 112 is attached at the stator member 111.

The air dynamic pressure bearing has three dynamic pressure bearing portions: a conical dynamic pressure bearing portion, a radial dynamic pressure bearing portion, and a thrust dynamic pressure bearing portion. The conical dynamic pressure bearing portion has a conical convex portion 121 and a column portion 122, and comprises a top-shaped convex side bearing member 120 and a concave side bearing member 130 having a conical concave portion 131 which is a bearing member fixed at the stator member 111 and to which the conical convex portion 121 is fitted without contact. Although dynamic pressure grooves G1 are formed at one of surface of the conical convex portion 121 and surface of the conical concave portion 131, the grooves thereof are formed at surface of the conical convex portion 121 here.

The radial dynamic pressure bearing portion is a bearing member located through the cylinder 123, and comprises a slender shaft 150 a lower end portion 153 of which is fixed at the stator portion 111 and the top-shaped convex side bearing portion 120. Although dynamic pressure grooves G1 are formed at one of outer circumference face of a slender column portion 151 of the slender shaft 150 and inner circumference face of said cylinder 123, the grooves thereof are formed outer circumference face of the column portion 151 here.

The thrust dynamic pressure bearing portion comprises a disk-shaped bearing member 140 fixed at an upper end portion 152 of the slender shaft 150 and the top-shaped convex bearing member 120. Although dynamic pressure grooves G2 are formed at one of a lower face 141 of the disk-shaped bearing member 140 and a vertical end face of the column portion 122 of the top-shaped convex bearing member 120, the grooves thereof are formed at vertical end face 124 of the column portion 122 here.

The disk-shaped bearing member 140, at enter portion of which an attaching hole 143 is formed, is attached to the slender shaft 150 by pressing or fitting the attaching hole 143 to upper end portion 152 of the slender shaft 150. The lower end portion 153 of the slender shaft 150 penetrates through an attaching hole 133 formed at a center portion of a first concave side bearing member 130 and an attaching hole 113 formed at a center portion of the stator member 111, and is fixed to the stator member 111 by a nut 154.

As each dynamic pressure groove G of the conical dynamic pressure bearing portion and the radial dynamic pressure portion is formed so that centers of dynamic pressure distribution of rotating shaft direction substantially match, inclination vibration seldom occurs so that stability of rotation improved. The rotor member 161 having a substantially cup-shaped hub construction in which the rotor magnet 162 is attached at the vertical portion 161b is fixed at the convex side bearing member 121 fitting the attaching hole 161a formed at the center portion thereof, and constitutes apart of the magnetic circuit of the motor as above-mentioned. Therefore, the spindle motor is stable in construction as flux goes through substantially gravity of rotating body driven by the spindle motor.

The top-shaped convex side bearing member 120, the concave side bearing member 130, and the disk-shaped bearing member 140 are made of stainless steel or aluminum, and a layer of diamond like carbon (DLC) having a predetermined thickness is formed at sliding surfaces thereof. Therefore, if sliding with contact occurs, there is seldom abrasion.

Although the conical apex angle of the conical convex portion 121 and the conical concave portion 131 is less than 45 degrees if point is set to load capacity of radial direction in the conical dynamic pressure bearing portion, 30 to 40 degrees is desirable. Although the conical apex angle is more than 45 degrees if point is set to load capacity of thrust direction, 50 to 70 degrees is desirable. The groove angle is 15 to 18 degrees regardless of the conical apex angle used. Although ratio of groove width, namely ratio of groove width to groove wave length is 0.4 to 0.7, 0.6 is desirable.

Although groove depth of the dynamic pressure groove G1 is 2 to 10 μm, 5 μm is desirable. Although groove patterns of the dynamic pressure groove G1 are herringbone or spiral grooves, herringbone groove is desirable.

In the thrust dynamic pressure bearing portion, the groove angle of the dynamic pressure groove G3 is 10 to 20 degrees, and 12 to 16 degrees is desirable. Ratio of groove width of the dynamic pressure groove G3 is 0.4 to 0.7, and 0.6 is desirable. Groove depth of the dynamic pressure groove G3 is 2 to 10 μm, and 5 μm is desirable. Although groove patterns of the dynamic pressure groove G3 are herringbone, spiral, and parallel grooves, spiral groove is desirable.

In the radial dynamic pressure bearing portion, groove angle of the dynamic pressure groove G2 is 12 to 20 degrees, and 15 to 20 degrees is desirable. Ratio of groove width of the dynamic pressure groove G2 is 0.4 to 0.7, and 0.6 is desirable. Groove depth of the dynamic pressure groove G2 is 2 to 10 μm, and 5 μm is desirable. Although groove patterns of the dynamic pressure groove G2 are herringbone, spiral, and parallel grooves, herringbone groove is desirable.

Figure 11:
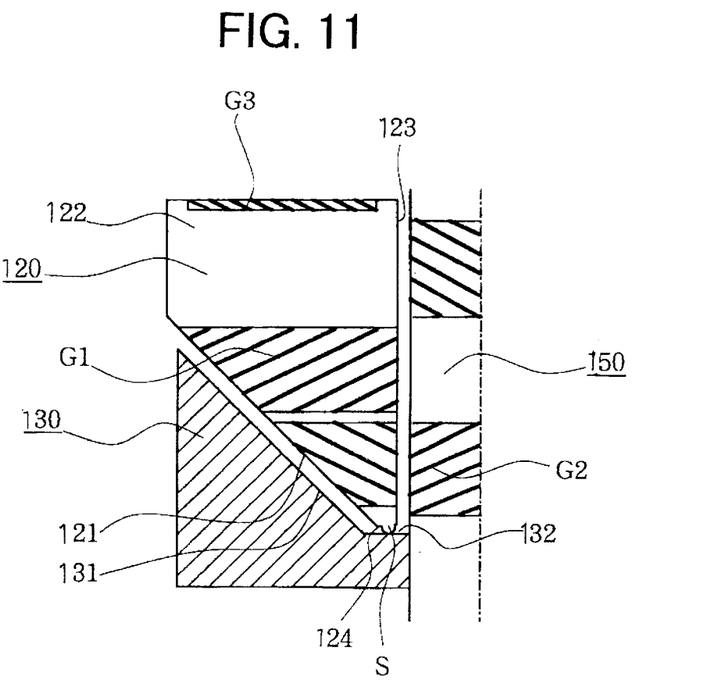
FIG. 11 is a partly enlarged sectional view of the air dynamic pressure bearing of FIG. 10.

As the projection portion S for supporting load of thrust direction is provided at the conical dynamic pressure bearing portion as shown in FIG. 11, contacting area between vertical end face 124 of the conical convex portion 121 and the bottom portion 132 of the conical concave portion 131 is decreased. The projection portion S is formed at one of vertical end face 124 of the conical convex portion 121 and the bottom portion 132 of the conical concave portion 131.

Radial dynamic pressure which the air dynamic pressure bearings having the radial dynamic pressure bearing portion and the conical dynamic pressure bearing portion at outer side and inner side in co-axial with rotating shaft generate is radial dynamic pressure that radial dynamic pressure component of the conical dynamic pressure bearing portion is added to radial dynamic pressure of the radial dynamic pressure bearing portion. Thrust dynamic pressure is dynamic pressure that thrust dynamic pressure component of the conical dynamic pressure bearing portion is added to thrust dynamic pressure of the thrust dynamic pressure bearing portion.

The present invention is a spindle motor and a rotating device having the spindle motor as a driving source of rotating body in which a rotor is supported at a stator by an air dynamic pressure bearing. The spindle motor comprises a first dynamic pressure bearing portion and a second dynamic pressure bearing portion using three bearing members: a convex side bearing member; a concave side bearing member; and a thin shaft. Therefore, numbers of parts is few, constitution is simple so as to miniaturize, and working cost is low comparing with the spindle motors having the prior air dynamic pressure bearing needing four bearing members or having magnetic bearing except the air dynamic pressure bearing comprising the convex side bearing member having the conical convex portion and the concave side bearing member having the conical concave portion in which said conical convex portion is fitted without contact. As the sliding contact during which the rotor and the disk-shaped thrust member rub at wide area is extremely decreased just before the motor stops or when the motor starts, the problem of shortening life of the product and so on is removed. The problem that adhesion of the rotor and the disk-shaped thrust member obstruct smooth start of the motor is removed. In short, a spindle motor and a rotating device having the motor as a driving source which is high in bearing stiffness and which enables smooth and stable rotation at a high speed are provided.

The spindle motor and the rotating device having the motor as a driving source of the sixth embodiment according to the present invention has an air dynamic pressure bearing in which the radial dynamic pressure bearing portion and the conical dynamic pressure bearing portion are located at an inner side and an outer side co-axially, and in which the thrust dynamic pressure bearing portion is located at an upper side of the conical dynamic pressure bearing portion. Further, the air dynamic pressure bearing fixes the disk-shaped bearing portion of the thrust dynamic pressure bearing portion at an upper end of the slender shaft of the radial dynamic pressure bearing portion and the concave side bearing member being component member of the conical dynamic pressure bearing portion at a lower end of the shaft. The air dynamic pressure bearing has the advantage that no inclination vibration and undesirable movement of the bearing member is generated toward the upper side. The air dynamic pressure bearing has the construction enabling miniaturization, and has advantage that high thrust dynamic pressure generates. Therefore, the spindle motor and the rotating device having the motor as a driving source providing the air dynamic pressure bearing having the above-mentioned advantages according to the present invention are used for larger load of thrust direction, and can increase stability and smoothness of rotation of the spindle motor.

What is claimed is:

1. In a spindle motor comprised of a rotor having a rotor magnet and a stator having a stator coil: an air dynamic pressure bearing for supporting the rotor for rotation about a rotational axis relative to the stator, the air dynamic pressure bearing comprising a conical dynamic pressure bearing portion comprised of a convex side bearing member having a conical convex portion and a column portion, a bore disposed in the convex side bearing member and extending along the rotational axis, a concave side bearing member having a conical concave portion receiving the conical convex portion, and dynamic pressure generating grooves formed on one of a surface of the conical convex portion and a surface of the conical concave portion; a radial dynamic pressure bearing portion comprised of a shaft extending through the bore of the dynamic pressure bearing portion and having a first end integrally connected to the concave side bearing member, and dynamic pressure grooves formed on one of an outer circumferential surface of the shaft and an inner circumferential surface of the bore; and a thrust dynamic pressure bearing portion comprised of a generally disk-shaped bearing member fixed at a second end of the shaft and having a surface disposed in confronting relation to an end surface of the column portion of the convex side bearing member, and dynamic pressure grooves formed at one of the surface of the disk-shaped bearing member and the end surface of the column portion of the convex side bearing member.

2. A spindle motor according to claim 1; wherein the dynamic pressure grooves of the conical dynamic pressure bearing portion and the radial dynamic pressure bearing portion are formed so that centers of a dynamic pressure distribution along the rotational axis match.

3. A spindle motor according to claim 1; wherein the rotor has a generally cup-shaped rotor member connected to the rotor magnet, the rotor member being integrally connected at a central portion thereof to the column portion of the convex side bearing member.

4. A spindle motor according to claim 1; wherein the convex side bearing member, the concave side bearing member and the disk-shaped bearing member are comprised of a material selected from the group consisting of stainless steal and aluminum.

5. A spindle motor according to claim 4; wherein the bearing member of the thrust dynamic pressure bearing has a surface in confronting relation to an end surface of the convex side bearing member; and further comprising a layer of diamond-like carbon disposed on at least one of the surface of the bearing member and the end surface of the convex side bearing member.

6. A spindle motor according to claim 4; wherein the conical convex portion of the convex side bearing member has an outer circumferential surface in confronting relation to an inner circumferential surface of the conical concave portion of the concave side bearing member; and further comprising a layer of diamond-like carbon disposed on at least one of the outer circumferential surface of the conical convex portion and the inner circumferential surface of the conical concave portion.

7. A spindle motor according to claim 1; further comprising a projection portion formed at a tip portion of the conical convex portion of the convex side bearing member for supporting a load in a thrust direction.

8. A spindle motor according to claim 7; further comprising a projection portion formed at a base portion of the conical concave portion of the concave side bearing member for supporting a load in a thrust direction.

9. A spindle motor according to claim 1; wherein the conical convex portion of the convex side bearing member and the conical concave portion of the concave side bearing member each has a conical apex angle of 30 to 40 degrees.

10. A spindle motor according to claim 1; wherein the conical convex portion of the convex side bearing member and the conical concave portion of the concave side bearing member each has a conical apex angle of 50 to 70 degrees.

11. A spindle motor according to claim 1; wherein the dynamic pressure generating grooves of the conical dynamic pressure bearing portion have a groove angle of 15 to 20 degrees.

12. In a rotating device having a rotary body, a spindle motor according to claim 5 for rotationally driving the rotary body.

13. In a spindle motor having a base frame, a stator integrally connected to the base frame, a rotor, and an air dynamic pressure bearing for supporting the rotor for rotation about a rotational axis relative to the stator, the air dynamic pressure bearing comprising: a first bearing member connected to the rotor for rotation therewith, the first bearing member having a convex conical portion and a bore; a second bearing member integrally connected to the base frame and having a bore, the second bearing member having a concave conical portion disposed in confronting relation to and receiving therein the convex conical portion of the first bearing member; and a shaft having a first end extending into the bore of the first bearing member and a second end extending into and being integrally connected to the bore of the second bearing member.

14. A spindle motor according to claim 13; further comprising first dynamic pressure generating grooves formed on one of a surface of the convex conical portion and a surface of the concave conical portion, and second dynamic pressure generating grooves formed on one of an outer circumferential surface of the shaft and an inner circumferential surface of the bore of the first bearing member.

15. In a rotating device having a rotary body, a spindle motor according to claim 14 for rotationally driving the rotary body.

\* \* \* \* \*